(12) United States Patent
Urushihata

(10) Patent No.: US 10,089,004 B2
(45) Date of Patent: Oct. 2, 2018

(54) PORTABLE ELECTRONIC APPARATUS

(71) Applicant: KYOCERA Corporation, Kyoto-shi, Kyoto (JP)

(72) Inventor: Mutsumi Urushihata, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 108 days.

(21) Appl. No.: 15/194,511

(22) Filed: Jun. 27, 2016

(65) Prior Publication Data

US 2016/0306521 A1    Oct. 20, 2016

Related U.S. Application Data

(63) Continuation of application No. 13/352,461, filed on Jan. 18, 2012, now Pat. No. 9,405,458.

(30) Foreign Application Priority Data

Jan. 18, 2011    (JP) .................. 2011-008041

(51) Int. Cl.
  *G06F 9/00*      (2006.01)
  *G06F 3/0488*    (2013.01)
      (Continued)

(52) U.S. Cl.
  CPC .......... *G06F 3/0488* (2013.01); *G06F 1/1626* (2013.01); *G06F 1/1656* (2013.01);
      (Continued)

(58) Field of Classification Search
  CPC .... G06F 1/1626; G06F 1/1635; G06F 1/1656; G06F 1/1692; G06F 1/1694; G06F 3/041; G06F 3/0412; G06F 3/0488; G06F 3/04883; G06F 15/0225; G06F 2200/1614; H04M 1/725
  See application file for complete search history.

(56) References Cited

U.S. PATENT DOCUMENTS 5,825,617 A     10/1998  Kochis et al.
6,157,958 A  *  12/2000  Armitage ............... G06F 1/1626
                                                  709/250

(Continued)

FOREIGN PATENT DOCUMENTS

JP    2004-340991 A    12/2004
JP    2006-18794 A     1/2006

(Continued)

OTHER PUBLICATIONS

Woodson, et al., Human Factors Design Handbook, 2nd Ed. 1982, McGraw Hill, p. 183, 186, 419, and 511.*

(Continued)

*Primary Examiner* — Michael J Eurice
(74) *Attorney, Agent, or Firm* — Hauptman Ham, LLP

(57) ABSTRACT

According to an aspect, a portable electronic apparatus includes a housing, a touch panel, and a control unit. The housing includes a first surface, and a convex section that is formed near an edge area of the first surface. The touch panel is arranged on the first surface, and includes a first area near the convex section and a second area excluding the first area. The control unit controls the touch panel to display an operation screen on the first area.

5 Claims, 6 Drawing Sheets

(51) Int. Cl.
  *G06F 3/041* (2006.01)
  *G06F 1/16* (2006.01)
  *H04M 1/725* (2006.01)
  *G06F 15/02* (2006.01)

(52) U.S. Cl.
  CPC ............ *G06F 1/1694* (2013.01); *G06F 3/041* (2013.01); *G06F 1/1635* (2013.01); *G06F 15/0225* (2013.01); *G06F 2200/1614* (2013.01); *H04M 1/725* (2013.01)

(56) References Cited

U.S. PATENT DOCUMENTS

| | | | |
|---|---|---|---|
| 6,165,142 A * | 12/2000 | Bar | A61B 5/1036 600/595 |
| 6,352,322 B1 | 3/2002 | Nakao | |
| 6,385,041 B1 | 5/2002 | Choi | |
| 8,239,130 B1 | 8/2012 | Upstill et al. | |
| 8,432,368 B2 | 4/2013 | Momeyer et al. | |
| 2001/0012000 A1* | 8/2001 | Eberhard | G06F 1/1601 345/173 |
| 2001/0036862 A1* | 11/2001 | Kitamori | A63F 13/08 463/37 |
| 2001/0054517 A1 | 12/2001 | Conklan et al. | |
| 2003/0076306 A1 | 4/2003 | Zadesky et al. | |
| 2003/0114206 A1 | 6/2003 | Timothy et al. | |
| 2003/0169563 A1 | 9/2003 | Adams et al. | |
| 2004/0212958 A1 | 10/2004 | Jones et al. | |
| 2005/0176486 A1* | 8/2005 | Nishimura | A63F 13/10 463/4 |
| 2005/0251760 A1* | 11/2005 | Sato | G06F 3/023 715/856 |
| 2007/0222769 A1* | 9/2007 | Otsuka | G01C 21/265 345/173 |
| 2007/0232348 A1 | 10/2007 | Tierling et al. | |
| 2007/0247793 A1 | 10/2007 | Carnevali | |
| 2007/0285227 A1 | 12/2007 | Timothy et al. | |
| 2008/0165115 A1 | 7/2008 | Herz et al. | |
| 2008/0165116 A1 | 7/2008 | Herz et al. | |
| 2009/0015555 A1 | 1/2009 | Takashima et al. | |
| 2009/0164035 A1 | 6/2009 | Zadesky et al. | |
| 2009/0325607 A1* | 12/2009 | Conway | G06F 1/1624 455/456.3 |
| 2010/0007510 A1 | 1/2010 | Ina et al. | |
| 2010/0021022 A1* | 1/2010 | Pittel | G06F 3/03545 382/123 |
| 2010/0079404 A1* | 4/2010 | Degner | G06F 3/03547 345/174 |
| 2010/0130260 A1 | 5/2010 | Naruse | |
| 2010/0291969 A1* | 11/2010 | Fujimoto | G06F 1/1626 455/556.1 |
| 2010/0321871 A1 | 12/2010 | Diebel et al. | |
| 2011/0167391 A1 | 7/2011 | Momeyer et al. | |
| 2011/0188179 A1* | 8/2011 | Myers | G06F 1/1626 361/679.01 |
| 2011/0234487 A1 | 9/2011 | Hiramoto | |
| 2012/0244917 A1* | 9/2012 | Hosoi | G02C 11/06 455/575.1 |

FOREIGN PATENT DOCUMENTS

| | | |
|---|---|---|
| JP | 2006-243521 A | 9/2006 |
| JP | 2007-41717 A | 2/2007 |
| JP | 2010-113503 A | 5/2010 |
| JP | 2010-124379 A | 6/2010 |
| WO | 2009/158685 A2 | 12/2009 |

OTHER PUBLICATIONS

Office Action in JP Application No. 2011-008041, dated Aug. 19, 2014, for which an explanation of relevance is attached.

* cited by examiner

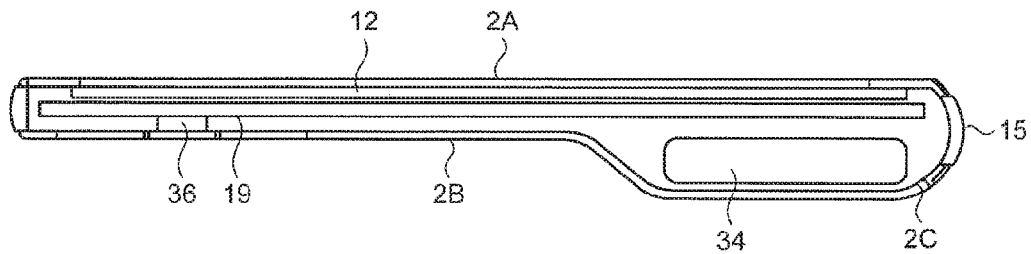
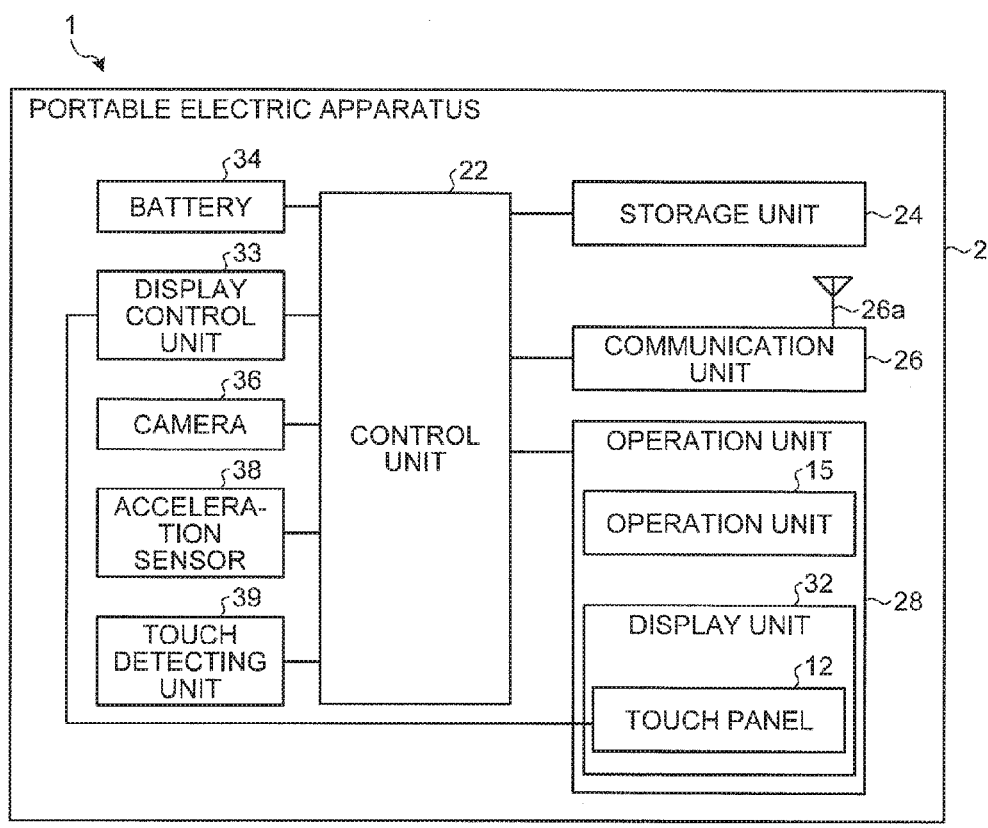

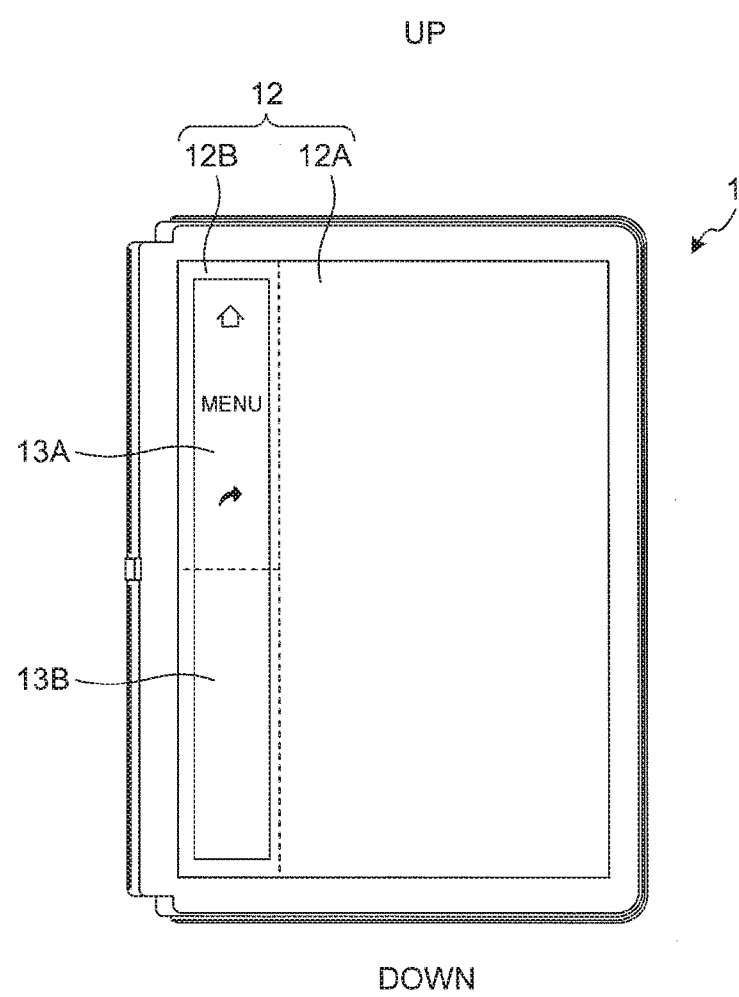

PORTABLE ELECTRONIC APPARATUS

The present application is a continuation of U.S. patent application Ser. No. 13/352,461 filed on Jan. 18, 2012, which claims priority from Japanese Application No. 2011-008041, filed on Jan. 18, 2011, the content of which is incorporated by reference herein in its entirety.

BACKGROUND

1. Technical Field

The present disclosure relates to a portable electronic apparatus that includes a display unit.

2. Description of the Related Art

A type of portable electronic apparatus has a display unit arranged on substantially the entire area of the front surface. For example, Japanese Patent Application Laid-Open No. 2006-243521 describes a portable electronic apparatus that uses electronic paper as a display panel to display texts and figures. There are mobile phones called "Smartphones" that have a touch-panel display unit.

With a portable electronic apparatus that has a display unit arranged on substantially the entire area of the front surface, a user can perform an input operation with his/her one hand while holding the housing of the portable electronic apparatus with the other hand. In other words, the user can perform an input operation even when the portable electronic apparatus is not placed on a desk. However, because the above input operation needs both hands, depending on a situation, it can be difficult to perform an input operation or even impossible when one hand is not available.

For the foregoing reasons, there is a need for a portable electronic apparatus that allows a user to perform an input operation easily, while holding the housing.

SUMMARY

According to an aspect, a portable electronic apparatus includes a housing, a touch panel, and a control unit. The housing includes a first surface, and a convex section that is formed near an edge area of the first surface. The touch panel is arranged on the first surface, and includes a first area near the convex section and a second area excluding the first area. The control unit controls the touch panel to display an operation screen on the first area.

BRIEF DESCRIPTION OF THE DRAWINGS

FIG. 6 is a cross-sectional view of the portable electronic apparatus cut along the A-A line of FIG. 2;

FIG. 7 is a block diagram of the portable electronic apparatus;

FIG. 8 is a diagram of an example of the image that is displayed on the edge area of the touch panel;

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components. The present invention can be applied to any type of portable electronic apparatuses, including but not limited to mobile phones, personal handyphone systems (PHS), personal digital assistants (PDA), portable navigation units, personal computers (including but not limited to tablet computers, netbooks etc.), media players, portable electronic reading devices, and gaming devices.

Figure 1:
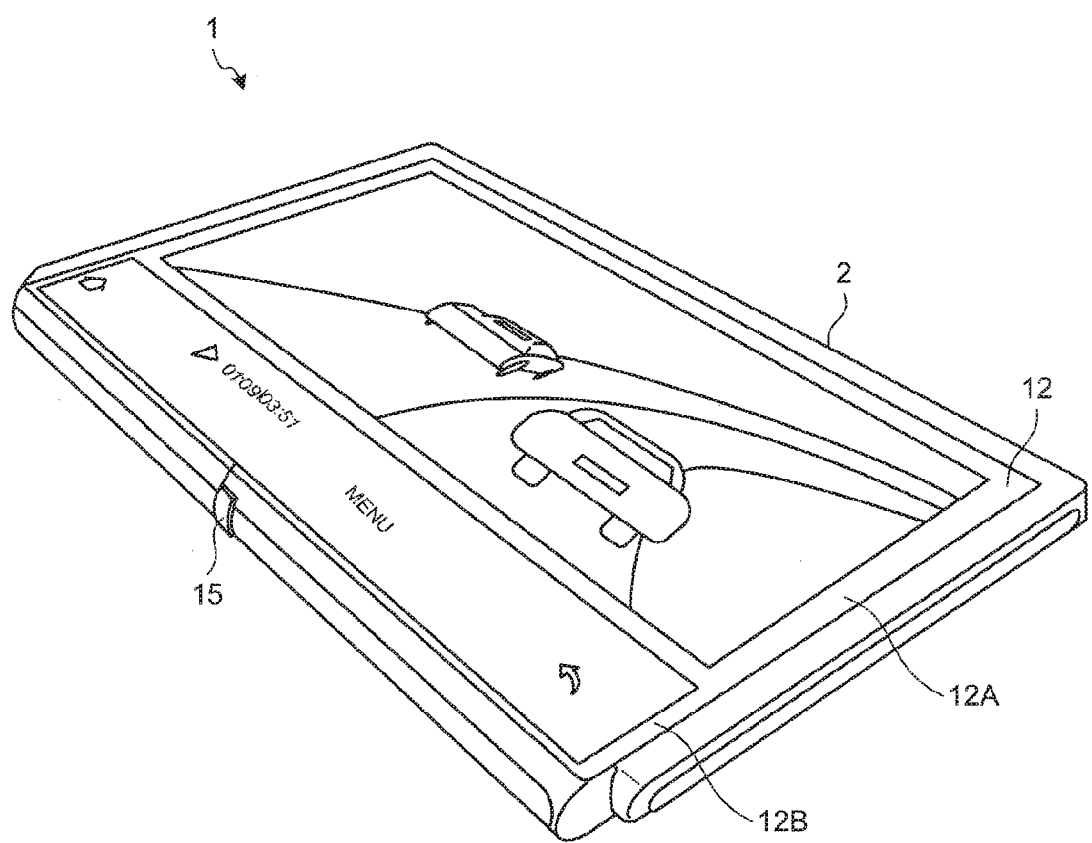
FIG. 1 is a schematic perspective view of a portable electronic apparatus according to an embodiment.
Figure 2:
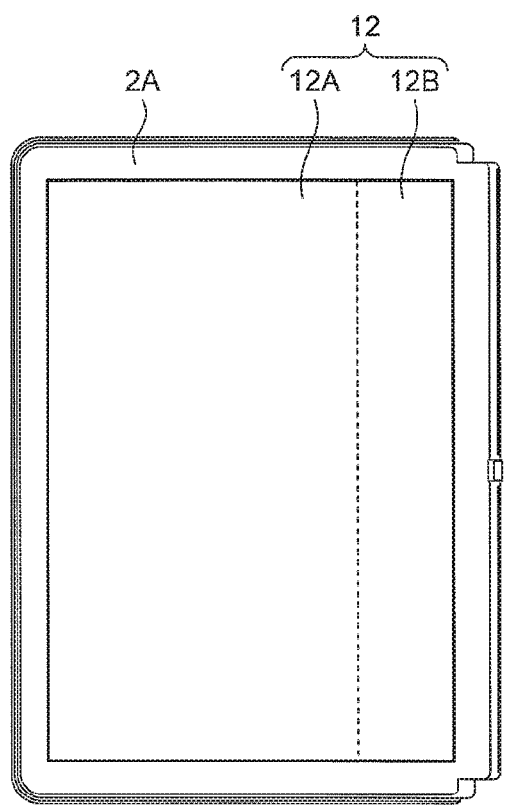
FIG. 2 is a front view of the portable electronic apparatus illustrated in FIG. 1.
Figure 3:
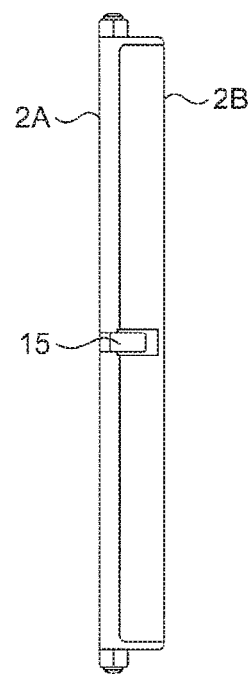
FIG. 3 is a side view of the portable electronic apparatus illustrated in FIG. 1, more particularly, a longitudinal side surface of the portable electronic apparatus.
Figure 4:
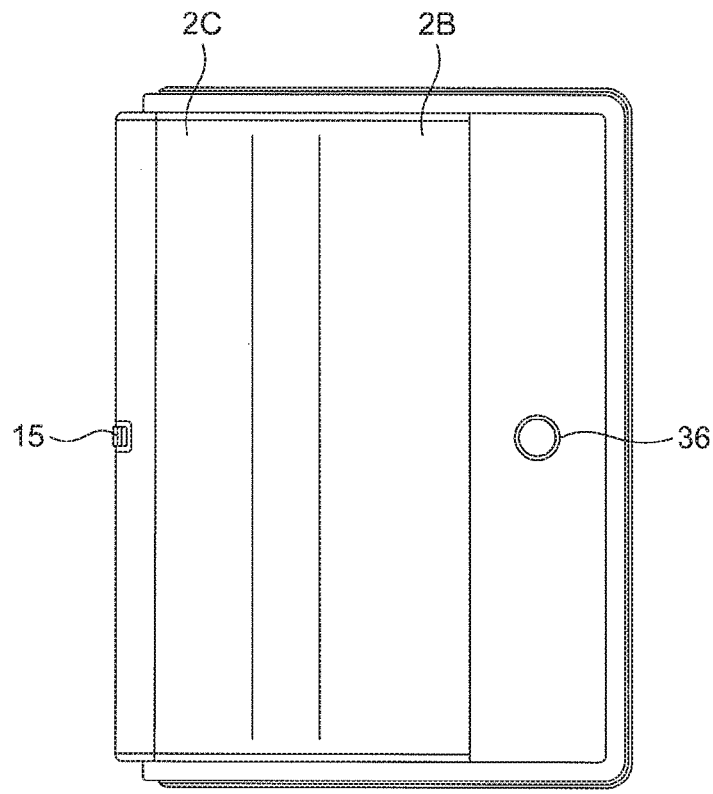
FIG. 4 is a back view of the portable electronic apparatus illustrated in FIG. 1.
Figure 5:
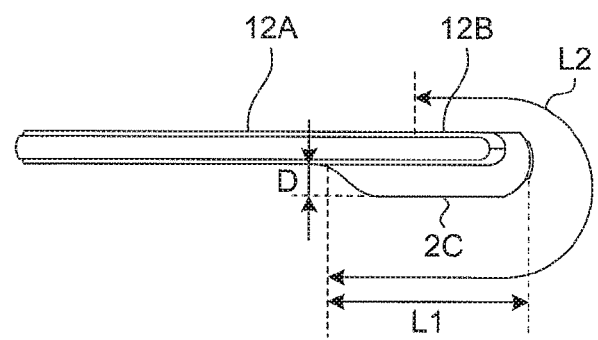
FIG. 5 is a side view of the portable electronic apparatus illustrated in FIG. 1, more particularly, a lateral side surface of the portable electronic apparatus.

The overall configuration of a portable electronic apparatus 1 will be explained with reference to FIGS. 1 to 6. FIG. 1 is a schematic perspective view of a portable electronic apparatus according to an embodiment. FIG. 2 is a front view of the portable electronic apparatus illustrated in FIG. 1. FIG. 3 is a side view of the portable electronic apparatus illustrated in FIG. 1, more particularly, a longitudinal side surface of the portable electronic apparatus. FIG. 4 is a back view of the portable electronic apparatus illustrated in FIG. 1. FIG. 5 is a side view of the portable electronic apparatus illustrated in FIG. 1, more particularly, a lateral side surface of the portable electronic apparatus. FIG. 6 is a cross-sectional view of the portable electronic apparatus cut along the A-A line of FIG. 2.

As illustrated in FIGS. 1 to 5, a housing 2 of the portable electronic apparatus 1 has an elongated plate shape, i.e., a rectangular shape having a predetermined thickness. Either surface of surfaces of the housing 2 that have the largest area (rectangular-shaped surfaces) is a front surface (first surface) 2A and the other surface is a back surface (second surface) 2B. Surfaces of the housing 2 that correspond to the predetermined thickness (surfaces that connect the front surface and the back surface) are side surfaces.

A finger rest section (convex section) 2C is formed on the back surface 2B of the housing 2. Because, for example, the user puts his/her finger on the section, the convex section is called "finger rest section 2C". The finger rest section 2C is a (convex-shaped) protrusion that protrudes from the back surface 2B (goes away from the front surface 2A) and that is formed near an edge of a longitudinal side surface. In other words, the finger rest section 2C is a convex shaped member that extends from end to end over the back surface 2B in the longitudinal direction and that is formed along an edge of a longitudinal side surface. As illustrated in FIG. 5, the angle between the plane of one area of an edge of the finger rest section 2C that is closer to the center of the back surface 2B and that extends in the longitudinal direction (an edge of the finger rest section 2C that extends in the longitudinal direction and that is closer to the center of the back surface 2B) and the plane of the other area of the back surface 2B (area on which the finger rest section 2C is not formed) is obtuse (greater than 90 degrees). As illustrated in FIG. 5, the finger rest section 2C is, if a certain portion is excluded, a plane that is parallel to the back surface 2B. As described above, the surface of the finger rest section 2C illustrated in FIG. 5 (surface parallel to the lateral direction) is formed in a substantially trapezoidal shape. The finger rest section 2C is a portion on which, when the user holds the housing 2, he/she puts the end of a finger. With this configuration, the user can put his/her finger (the end of his/her finger, etc.,) on a slope portion of an edge of the finger rest section 2C that is closer to the center of the back surface 2B and that extends in the longitudinal direction.

The housing 2 has the above shape and has the finger rest section 2C that is formed near an edge of the back surface 2B in the lateral direction such that it extends in the longitudinal direction. Therefore, regarding the housing 2, the thickness of one area on which the finger rest section 2C is formed is greater than the thickness of the other area. An edge of the finger rest section 2C in the lateral direction that is closer to the center forms a step.

The units of the portable electronic apparatus 1 provided on the housing 2 will be explained below with reference to FIGS. 1 to 6. A touch panel 12 is arranged on the front surface 2A of the housing 2. The shape of the touch panel 12 is a rectangular that has short sides extending in the lateral direction of the front surface 2A and long sides extending in the longitudinal direction of the front surface 2A. The touch panel 12 occupies almost the entire area of the front surface 2A. The touch panel 12 has two areas including a main area 12A and an edge area 12B. The main area 12A occupies almost the entire area of the front surface 2A except an area that faces the finger rest section 2C. In other words, the main area 12A extends in the longitudinal direction over substantially the entire front surface 2A and is an area that is included in the front surface 2A that faces, in the lateral direction, the area excluding a certain edge area near the side surface along which the finger rest section 2C is formed. The shape of the edge area 12B is a rectangular that has short sides extending in the lateral direction of the front surface 2A and long sides extending in the longitudinal direction of the front surface 2A. The edge area 12B is included in the front surface 2A and occupies substantially the entire area that faces the finger rest section 2C. In other words, the edge area 12B extends in the longitudinal direction over substantially the entire front surface 2A and is an area that is included in the front surface 2A and that faces, in the lateral direction, the area including the certain edge area near the side surface along which the finger rest section 2C is formed.

The touch panel 12 displays thereon texts, figures, images, etc., and detects various operations performed by a user with his/her finger(s), a stylus, or the like (in the description herein below, for the sake of simplicity, it is assumed that the user touches the first touch panel 12 and the second touch panel 13 with his/her finger(s)) on the touch panel 12. In other words, the touch panel 12 has two functions including an image displaying function (as a display unit) and an operation detecting function (as an operation unit). As illustrated in FIG. 1, the portable electronic apparatus 1 of the present embodiment displays videos and images mainly on the main area 12A and an operation screen containing an operation menu (including, e.g., a size-increasing key, a size-decreasing key, a home key, a menu key, etc.,) mainly on the edge area 12B. Any screen can be an operation screen as long as it contains at least an operation menu and it is unnecessary to add a definite border (i.e., the outline of the operation screen) to distinguish the operation screen from the other screens.

The housing 2 has an operation unit 15 on a side surface along which the finger rest section 2C is formed. The operation unit 15 is disposed in the center of the side surface in the longitudinal direction. The operation unit 15 is a physical key that detects a push operation. When pushed down, the operation unit 15 is moved toward the lateral direction of the front surface 2A.

The housing 2 has a camera 36 on the back surface 2B. The camera 36 is arranged near an edge of the back surface 2B that is opposite to the edge along which the finger rest section 2C is formed. In other words, the camera 36 is arranged in the center of the back surface 2B in the longitudinal direction and on an edge in the lateral direction that is opposite to the edge on which the finger rest section 2C is arranged.

The internal configuration of the portable electronic apparatus 1 will be explained below with reference to FIG. 6. As illustrated in FIG. 6, inside the housing 2 are arranged the touch panel 12, the operation unit 15, a circuit substrate 19, a battery 34, and the camera 36. The arrangement positions and the configuration of the touch panel 12 and the operation unit 15 are explained above; therefore, the same explanation is not repeated.

The circuit substrate 19 is a substrate for mounting electronic components thereon that have the functions of a later described control unit 22, a later described storage unit 24, etc., such as a central processing unit (CPU), a memory, etc. The circuit substrate 19 is disposed closer to the back surface 2B than the touch panel 12. The battery 34 is accommodated in the finger rest section 2C. In other words, the battery 34 is disposed in an area that faces the edge area 12B of the touch panel 12 of the housing 2 and closer to the back surface 2B than the edge area 12B.

The relation between the functions of the portable electronic apparatus 1 and the control unit 22 will be explained below. FIG. 7 is a block diagram of the portable electronic apparatus illustrated in FIG. 1. As illustrated in FIG. 7, the portable electronic apparatus 1 includes the control unit 22, the storage unit 24, a communication unit 26, an operation unit 28, a display unit 32, a display control unit 33, the battery 34, the camera 36, an acceleration sensor 38, and a touch detecting unit 39. The portable electronic apparatus 1 may further include a microphone, a receiver, a speaker, etc.

The control unit 22 is a processing unit that integrally controls the operations of the portable electronic apparatus 1. The control unit 22 is, for example, a CPU. In other words, the control unit 22 controls the operations of the communication unit 26, the display unit 32, etc., so that various processes of the portable electronic apparatus 1 are executed in an order appropriate to the operation of the operation unit 28 and the software stored in the storage unit 24 of the portable electronic apparatus 1. The control unit 22 performs processes in accordance with a program stored in the storage unit 24 (e.g., an operating system program, an application program, etc.).

The storage unit 24 stores therein software and data that are used in a process performed by the control unit 22. For example, the storage unit 24 stores therein a program that is used for controlling an image to be displayed on the display unit 32 and a program that is used to send/receive an e-mail. The storage unit 24 also stores therein not only programs but also various data. For example, the storage unit 24 stores therein various setting conditions, dictionary data that is used for character conversion, video data that is displayed on the display unit 32, etc.

The communication unit 26 establishes, via a channel that is assigned by a base station via an antenna 26a, a wireless signal path based on the code-division multiple access (CDMA) system, or any other wireless communication protocols, with the base station, and performs information communications with the base station. Any other wired or wireless communication or network interfaces, e.g., LAN, Bluetooth, Wi-Fi, NFC (Near Field Communication) may also be included in lieu of or in addition to the communication unit 26.

The operation unit 28 includes the touch panel 12 and the operation unit 15. When a user performs an input operation on the touch panel 12 or the operation unit 15, the operation unit 28 inputs the detail of the operation to the control unit 22.

As described above, the display unit 32 includes the touch panel 12. The touch panel 12 of the display unit 32 displays a video, an image, and the like on the display device in accordance with data received from the control unit 22 via the display control unit 33. The battery 34 is a power supply that supplies an electric power to each unit of the portable electronic apparatus 1, such as the control unit 22.

The camera 36 is an image capturing device that acquires an image of an image capturing area that faces the back surface 2B (an area indicated by a predetermined angle of view). The camera 36 sends information containing a captured image to the control unit 22. The acceleration sensor 38 is a detector that detects the acceleration exerted on the housing 2. The acceleration sensor 38 detects the acceleration exerted on the housing 2, thereby detecting the orientation of the housing 2. A detector that detects the acceleration in various manners can be used as the acceleration sensor 38. For example, the detector used can be a detector that detects the acceleration by using a change in the capacitance, a change in the piezoresistance, a change in the relative position, etc.

The touch detecting unit 39 is a detector that detects whether the finger rest section is being touched, i.e., whether a user holds the housing 2. The touch detector 39 can be configured to have a touch sensor or the like arranged on the finger rest section 2C. The touch sensor is arranged on a surface of the finger rest section 2C on which the user will touch with his/her finger, more particularly, on a surface including a portion that corresponds to the center-side stepwise edge of the finger rest section 2C in the lateral direction. Alternatively, the edge area 12B of the touch panel 12 may have the function of the touch detecting unit 39. In this case, upon detecting a touch on the edge area 12B, the touch detecting unit 39 determines that a user's finger is on the finger rest section 2C.

As described above, because the finger rest section 2C is provided on the back surface 2B of the housing 2 of the portable electronic apparatus 1, when the user holds the housing 2 with one hand, the user can support the edge on which the finger rest section 2C is formed with his/her finger putting on the finger rest section 2C. With this configuration, the user can hold the housing 2 with his/her finger (any of the first, the second, the third, and the fourth fingers) putting on the finger rest section 2C and his/her thumb putting on the front surface 2A.

Moreover, an operation screen (operation item that is associated with an image that is displayed on the touch panel 12 (mainly on the main area 12A)) is displayed on the edge area 12B of the touch panel 12, which is a component of the operation unit 28 and arranged in the area of the front surface 2A that faces the finger rest section 2C. With this configuration, the user can perform, while holding the housing 2 with a hand, an input operation with the same hand on the operation screen that is displayed on the edge area 12B. Therefore, the user can perform an input operation, while holding the housing 2 with one hand. Moreover, because an operation screen is displayed on the edge area 12B, which is hidden partially by the user's hand when the user holds the housing 2, it is possible to display a screen of a video or the like for the purpose of user's appreciation and browsing on the main area 12A, which is not hidden by the user's hand and has a larger area than the area of the edge area 12B. With this configuration, the user can perform, while holding the housing 2 with one hand, an input operation with the same hand, if necessary, in such a manner that the user can prevent the video, etc., which is displayed for the purpose of appreciation and browsing, from being hidden by the same hand. Therefore, the area of the front surface 2A is used efficiently for displaying an image and the like, and the operability is improved.

Moreover, because the operation unit 15 is arranged on a side surface adjacent to the edge area 12B of the front surface 2A, the user can perform, while holding the housing 2 with a hand, an input operation with the same hand not only on the edge area 12B but also by using the operation unit 15.

Moreover, because the battery 34, which is heavy, is accommodated in the finger rest section 2C, the user can support the housing 2 of the portable electronic apparatus 1 easily with one hand. In other words, of the portable electronic apparatus 1, with respect to the lateral direction of the front surface 2A, the side on which the finger rest section 2C is arranged, i.e., the side on which the user holds the housing 2 with one hand, is heavier than the opposite side; therefore, the user can hold the housing 2 easily.

In the present embodiment, the battery 34 of the portable electronic apparatus 1 is accommodated in the finger rest section 2C. However, any configuration is allowable as long as the center of gravity of the portable electronic apparatus 1 is in a side in which the finger rest section 2C is arranged, more particularly, with respect to a direction perpendicular to the edge surface on which the finger rest section 2C is arranged, the center of gravity of the portable electronic apparatus 1 is at any position in one side from the center where the edge on which the finger rest section 2C is arranged. Because the center of gravity of the portable electronic apparatus 1 is in a side where the finger rest section 2C is arranged, when the user holds the side where the finger rest section 2C is arranged, he/she can easily hold the housing 2.

When the touch detecting unit 39 detects a touch (contact) on the finger rest section 2C (the touch detecting unit 39 detects that a finger is put on the finger rest section 2C), the portable electronic apparatus 1 displays an operation screen on the edge area 12B. When the touch detecting unit 39 detects that no finger is put on the finger rest section 2C, the portable electronic apparatus 1 displays no operation screen on the edge area 12B. With this configuration, when the user holds the housing 2 by the finger rest section 2C, i.e., when the user is ready to perform an input operation with the same hand with which the housing 2 is supported, an operation screen is displayed. When the touch detecting unit 39 detects that no finger is put on the finger rest section 2C, the portable electronic apparatus 1 displays a screen for the purpose of user's appreciation and browsing on a combined area of the main area 12A and the edge area 12B. Therefore, when no operation screen is displayed, a size-increased screen is displayed for the purpose of user's appreciation and browsing. Moreover, because the portable electronic apparatus 1 operates as described above, just when the user holds the finger rest section 2C, an operation screen is ready to be operated; therefore, the operability is increased.

The control unit 22 of the portable electronic apparatus 1 displays, on the edge area 12B, information that relates to an operation (operation menu) in accordance with a screen displayed on the main area 12A. With this configuration, because an operation screen containing an operation menu that is associated with an image displayed on the main area 12A is displayed on the edge area 12B, the user can operate the screen displayed on the main area 12A by manipulating the operation screen displayed on the edge area 12B.

The control unit 22 displays information indicative of at least one of the date, the time, the remaining battery level, and the radio field intensity on the edge area 12B, i.e., uses the edge area 12B as something called "sub-display unit". With this configuration, because information indicative of at least one of the date, the time, the remaining battery level, and the radio field intensity is displayed on a part of the operation screen, it is unnecessary to display the information on the main area 12A; therefore, it is possible to display on the main area 12A only a screen that is displayed for the purpose of appreciation and browsing by the user. If the touch detecting unit 39 detects no touch on the finger rest section 2C, it is allowable to display not the operation screen but information indicative of at least one of the date, the time, the remaining battery level, and the radio field intensity on the edge area 12B.

The portable electronic apparatus 1 may detect an input operation on the edge area 12B as an input operation on a touch pad. In this case, it is allowable to detect an input operation without displaying an image on the edge area 12B. With this configuration, because an input operation on the edge area 12B is detected as an input operation on a touch pad, the user can perform, while holding the housing 2 with a hand, various input operations with the same hand to operate a screen displayed on the main area 12A, more particularly, move the cursor appearing on the main area 12A, scroll the page, and move the screen.

As described in the present embodiment, the portable electronic apparatus 1 has the camera 36 near an edge that is different from the edge of the back surface 2B on which the finger rest section 2C is arranged. Therefore, even when the user holds the housing 2 by the finger rest section 2C, the lens of the camera 36 is not covered with the user's hand. With this configuration, the user can use the camera 36 easily.

As described in the present embodiment, an edge of the finger rest section 2C that is closer to the center of the back surface 2B and that extends in the longitudinal direction is sloped at an acute angle. With this configuration, the user can easily put his/her finger (especially, the end of his/her finger) on the finger rest section 2C. Therefore, the user can hold the housing 2 easily.

As described in the present embodiment, the finger rest section 2C extends in the longitudinal direction over the back surface 2B. With this configuration, the user can put his/her finger on the finger rest section 2C even when he/she holds the housing 2 by any position of a side surface on which the finger rest section 2C is formed. Therefore, the user can hold the housing 2 easily. Moreover, when the user performs, while holding the housing 2 with a hand, an input operation on the edge area 12B with the same hand, the user can perform an input operation while moving the hand along the side surface of the housing 2. With this configuration, the user can perform an input operation on any position of the edge area 12B from end to end in the longitudinal direction.

As described in the present embodiment, the finger rest section 2C is a convex-shaped section that extends from near an edge of the back surface 2B to a position on which the end of a user's finger will be put and the level of the convex section is higher than the level of a portion of the back surface 2B that is different from the finger rest section 2C (area excluding the finger rest section 2C), i.e., the finger rest section 2C is a level-increased section that extends from near an edge of the back surface 2B to a position on which the end of a user's finger will be put. Because the finger rest section 2C is an extending level increased section, the user can hold the housing 2 easily. Moreover, because the finger rest section 2C is an extending level-increased section, the housing 2 has such a large inner space that can accommodate therein various components, such as the battery 34. In the present embodiment the finger rest section 2C is an extending level-increased section. However, the finger rest section 2C can take any shape as long as the level of a position on which a user's finger will be put is increased. The finger rest section 2C can be a level-increased section (protrusion section) formed at a position away a predetermined distance from an edge of the back surface 2B of the housing 2.

A portion of the finger rest section 2C on which the end of a user's finger will be put (edge closer to the center of the back surface 2B) is preferably away 50 mm or less from an edge of the back surface 2B, i.e., a distance L1 of FIG. 5 is preferably equal to or less than 50 mm. With this configuration, when the user holds the housing 2, the end of a user's finger is put on the finger rest section 2C properly. Therefore, the user can hold the housing 2 easily.

Moreover, the level of the finger rest section 2C or the level of the level-increased section is preferably higher than the level of a portion of the back surface 2B that is different from the finger rest section 2C (the other area) by a value equal to or greater than 4 mm and equal to or less than 6 mm, i.e., a distance D of FIG. 5 is preferably a value equal to or greater than 4 mm and equal to or less than 6 mm and, more preferably, about 5 mm. With this configuration, the user can easily nip the housing 2 with one hand. Moreover, because the step of the portion on which a user's finger will be put has a height equal to or greater than a certain value, the user can put his/her finger easily. Moreover, because the finger rest section 2C has a large inner space, it is easy to accommodate various components therein.

The housing 2 is preferably formed such that the distance on the surface between an edge of the edge area 12B that is closer to the center of the front surface 2A and that extends in the longitudinal direction (edge extending in the longitudinal direction) and the portion of the finger rest section 2C that is formed on the back surface 2B and on which the end of a user's finger will be put (the distance on the surface between the edge of an operation screen that is displayed on the touch panel 12 (more particularly, an edge of an operation screen that is displayed on the edge area 12B and that is closer to the center of the front surface 2A) and the edge of the finger rest section 2C (edge of the finger rest section 2C closer to the center of the back surface 2B)), i.e., a distance L2 of FIG. 5 is equal to or greater than 80 mm and equal to or less than 120 mm and, more preferably, about 100 mm. In other words, the sum of the length of the edge area 12B in the lateral direction, the thickness of the housing 2, and the length of the finger rest section 2C in the lateral direction is preferably equal to or greater than 80 mm and equal to or less than 120 mm and, more preferably, about 100 mm. The housing 2 is not limited to the relation of lengths that is described in the present embodiment, and the housing 2 can be variously formed by relatively changing the length of the edge area 12B in the lateral direction, the thickness of the housing 2, and the length of the finger rest section 2C in the lateral direction. If any of the length of the edge area 12B in the lateral direction, the thickness of the housing 2, and the length of the finger rest section 2C in the lateral direction is changed, the other length or thickness is changed relatively so that the sum of the lengths and the thickness becomes equal to or greater than 80 mm and equal to or less than 120 mm or about 100 mm. Because the sum is limited to a value within the above range, the user can put his/her thumb on the area where the edge area 12B is arranged on the housing 2 while putting his/her finger on an edge of the finger rest section 2C that is closer to the center of the back surface 2B. With this configuration, the user can hold the finger rest section 2C more easily and perform an input operation on the edge area 12B more easily.

The portable electronic apparatus 1 is configured to switch the orientation and the position of a screen displayed on the main area 12A and the orientation and the position of an operation screen displayed on the edge area 12B in accordance with the orientation of the housing 2 detected by the acceleration sensor 38. In other words, the control unit 22 sets, in accordance with the orientation of the housing 2 detected by the acceleration sensor 38, the display orientation of a screen displayed on the main area 12A and the display orientation of an operation screen displayed on the edge area 12B. Because, as described above, the orientations of screens that are displayed on the main area 12A and the edge area 12B are set in accordance with the orientation of the housing 2, images are displayed in the appropriate orientation so that the user can easily recognize them. For example, the upward direction of a screen is aligned with the vertically upward direction. It is allowable to adjust the relation between the orientation of the housing 2 and the orientation of a screen by a user setting.

Figure 9:
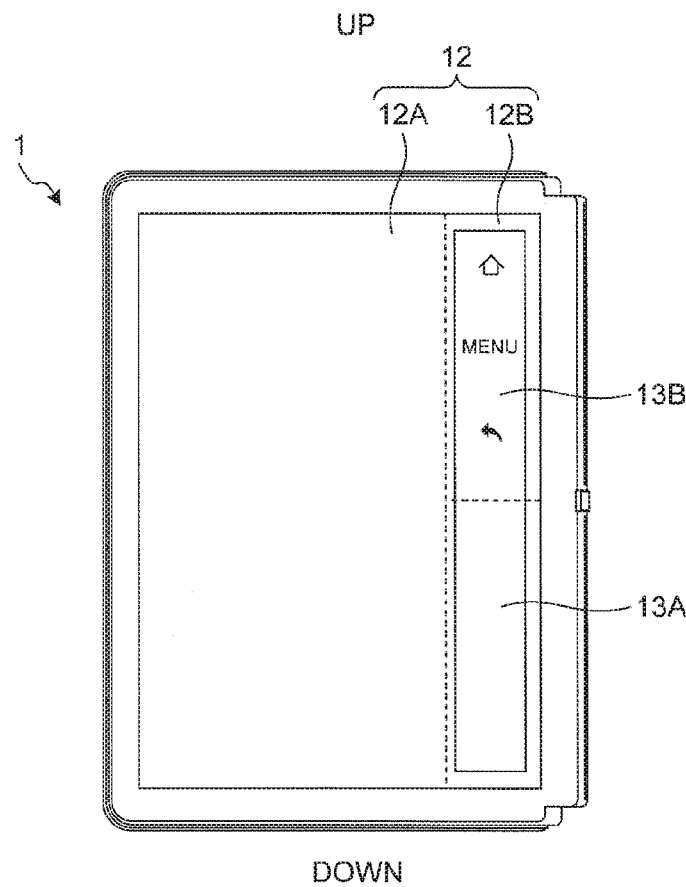
FIG. 9 is a diagram of an example of the image that is displayed on the edge area of the touch panel.
Figure 10:
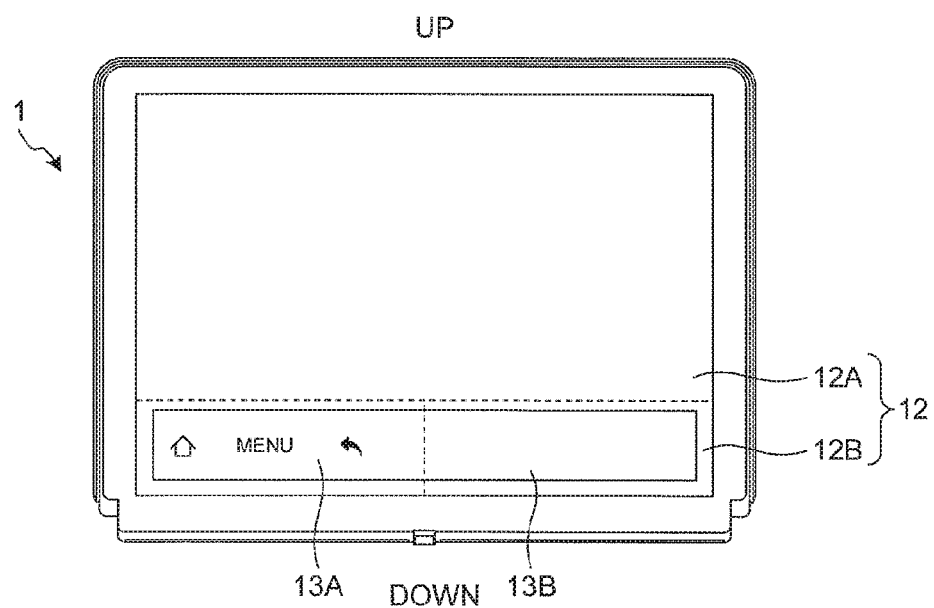
FIG. 10 is a diagram of an example of the image that is displayed on the edge area of the touch panel.

The control unit 22 is configured to display information that relates to an operation on the upper area of the edge area 12B (vertically upward area) preferentially. This will be explained with reference to FIGS. 8 to 10. FIGS. 8 to 10 are diagrams of examples of an image that is displayed on the edge area of the touch panel. In FIGS. 8 to 10, the edge area 12B is separated into two areas by the center in the longitudinal direction by using a plane parallel to the lateral direction as a cross section: one area is a first area 13A and the other area is a second area 13B. As illustrated in FIG. 8, when the first area 13A of the edge area 12B is vertically upward of the second area 13B, the portable electronic apparatus 1 displays an operation screen containing an operation menu on the first area 13A. The operation menu illustrated in FIG. 8 includes the home key, the menu key, and the return-back key. As illustrated in FIG. 9, when the second area 13B of the edge area 12B is vertically upward of the first area 13A, the portable electronic apparatus 1 displays the operation menu on the second area 13B. As illustrated in FIG. 10, when the main area 12A is vertically upward of the edge area 12B, the portable electronic apparatus 1 displays the operation menu on the second area 13B. In any example of FIGS. 8 to 10, the operation menu is displayed with the upper side of displayed texts and signs vertically upward. When the portable electronic apparatus 1 is arranged in the orientation as illustrated in FIG. 10, it is allowable to display the operation menu on the first area 13A.

Because, as illustrated in FIGS. 8 and 9, an operation menu is displayed on a vertically upward area of the edge area 12B, the operation menu is displayed on an area where the user can operate, when holding the housing 2 with a hand, the operation menu easily with the same hand. With this configuration, the user can operate, when holding the housing 2 with a hand, the edge area 12B with the same hand easily and, therefore, the operability is improved.

The control unit 22 may be configured to display a operation screen containing an operation menu (operation items) on the upper area of the edge area 12B in accordance with an image displayed the upper area of the main area 12A and displays an operation screen containing an operation menu on the lower area of the edge area 12B in accordance with an image displayed the lower area of the main area 12A. When, for example, images that relate to different applications are displayed on the upper area and the lower area of the main area 12A, respectively, an operation menu that relates to the application of the image displayed on the upper area is displayed on the upper area of the edge area 12B and an operation menu that relates to the application of the image displayed on the lower area is displayed on the lower area of the edge area 12B. Because, as described above, the position of an operation menu displayed on the edge area 12B is decided in accordance with an image (screen, window) displayed on the main area 12A, the portable electronic apparatus 1 allows an intuitive operation and therefore, the user can operate the portable electronic apparatus 1 easily. When an image of one application is displayed on the main area 12A, the control unit 22 displays, in the same manner, an operation menu that relates to a constituent element of the displayed image on the edge area 12B near the constituent element.

In the above embodiment, the finger rest section 2C is arranged along a longitudinal side surface of the back surface 2B. However, the edge along which the finger rest section 2C is arranged is not limited thereto. The finger rest section of the portable electronic apparatus may be arranged along a lateral side surface. In other words, the finger rest section may be arranged on an edge of the back surface that is adjacent to a lateral side surface.

In the above embodiment, operation items (operation menu) that correspond to an image displayed on the main area 12B are displayed on the edge area 12B of the front surface 2A aligned in the longitudinal direction. However, the configuration is not limited thereto. The positional relation between operation items that are displayed on the edge area 12B can be set variously. For example, it is allowable to arrange the operation items circularly on the edge area 12B of the front surface 2A or in an inclined line (line inclined with respect to the longitudinal direction). If the operation items are arranged circularly, it is possible to arrange two or more operation menus at given positions such that the user easily moves, while holding the housing 2 with a hand, the end of his/her finger of the same hand between the positions. When the operation menu is arranged in an inclined line, the menu may be arranged not only in an inclined straight line but also in a staggered manner.

The advantages are that one embodiment of the invention provides a portable electronic apparatus that allows a user to perform an input operation easily, while holding the housing.

What is claimed is:
1. A portable electronic apparatus comprising:
a housing including a front surface and a back surface opposite to the front surface, the housing having a longer side in the first direction and a shorter side in a second direction crossing the first direction;
a touch panel arranged on the front surface,
an acceleration sensor that detects an orientation of the housing; and
a touch detector on the front surface,
wherein the back surface includes a back edge area near one edge of the back surface and a back main area excluding the back edge area, a first width, which is between the back edge area and the front surface in a third direction vertical to the front surface, is wider than a second width, which is between the back main area and the front surface in the third direction, the front surface includes a front edge area near one edge of the front surface and a front main area excluding the front edge area, the front edge area including a first front-edge area and a second front-edge area arranged in the first direction, the touch detector detects a touch operation at least on the first front-edge area and the second front-edge area, when the acceleration sensor detects that the first front-edge area is above the second front-edge area in the third direction, a predetermined function is assigned according to the operation in the first front-edge area, and when the acceleration sensor detects that the second front-edge area is above the first front-edge area in the third direction, the predetermined function is assigned according to the operation in the second front-edge area.

2. The portable electronic apparatus according to claim 1, wherein the first width at the widest point is wider than the second width by a value equal to or greater than 4 mm.

3. The portable electronic apparatus according to claim 1, wherein the first width at the widest point is wider than the second width by a value equal to or less than 6 mm.

4. The portable electronic apparatus according to claim 1, wherein a length, which is from an edge of the front edge area at a center side of the front surface, around the side surface, and to the back first edge, is equal to or less than 80 mm.

5. The portable electronic apparatus according to claim 1, wherein when the acceleration sensor detects that the first front-edge area is above the second front-edge area in the third direction, a menu is displayed in the first front-edge area, and an image is displayed in the front main area such that an upper side of a text displayed in the front main area is upper in the third direction, and when the acceleration sensor detects that the second front-edge area is above the first front-edge area in the third direction, a menu is displayed in the second front-edge area, and an image is displayed in the front main area such that an upper side of a text displayed in the front main area is upper in the third direction.

* * * * *